A. ARNOLD.
VALVE GOVERNOR.
APPLICATION FILED AUG. 23, 1919.

1,384,113.  Patented July 12, 1921.

Inventor
Albert Arnold,

By
Attorneys

UNITED STATES PATENT OFFICE.

ALBERT ARNOLD, OF DETROIT, MICHIGAN.

VALVE-GOVERNOR.

1,384,113.　　　　　Specification of Letters Patent.　　Patented July 12, 1921.

Application filed August 23, 1919. Serial No. 319,440.

*To all whom it may concern:*

Be it known that I, ALBERT ARNOLD, a citizen of the United States of America, residing at Detroit, in the county of Wayne and State of Michigan, have invented certain new and useful Improvements in Valve-Governors, of which the following is a specification, reference being had therein to the accompanying drawings.

My invention aims to provide a governor valve that may be advantageously used as a speed regulator in connection with the fuel supply system of motor vehicles, the governor valve being mechanically operated from some driven part of the motor vehicle so that an excessive or predetermined speed of the motor driven part of the vehicle may actuate the governor valve to proportionately reduce the supply of fuel to the motor. It is in this connection that the governor valve may be readily installed between the carbureter and manifold intake connection of an internal combustion engine providing the power plant of an automobile, truck or similar vehicle, and the mechanical operation of the governor valve is in contradistinction to those types of speed regulators controlled solely by the partial vacuum produced in an intake manifold by an engine.

My invention further aims to provide a self contained governor valve wherein the valve, *per se*, is constructed so that it will be effected by centrifugal force and caused to adjust itself relative to a valve seat to restrict the passage between the valve and its seat. This is accomplished without resorting to any mechanism other than means for revolving the valve, and provision is made so that the actuation of the valve may be predetermined and made extremely sensitive so that there will be a positive control of the speed of the vehicle or the supply of fuel to the power plant of the vehicle.

My invention further aims to provide a speed regulator embodying a novel connection for transmitting power to a governor valve in a conduit to which the connection is attached and adapted to be swung at a desired angle relative thereto.

The above are a few of the characteristics of my invention and others will appear as the nature of the invention is better understood, with the assistance of the drawing, wherein Figure 1 is a vertical sectional view of a governor valve in accordance with my invention;

Figure 1:
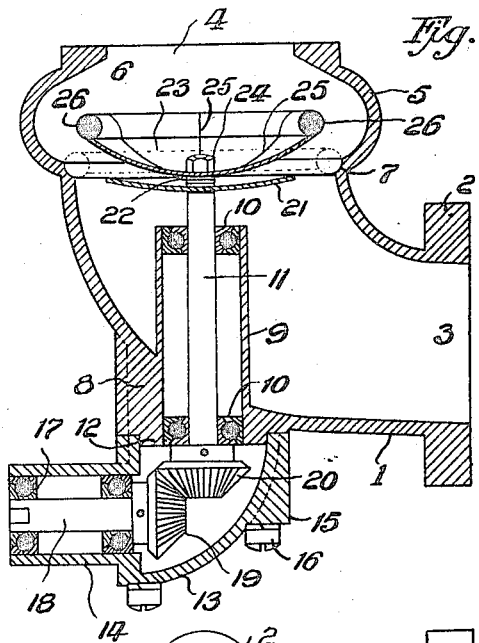
Figure 2:
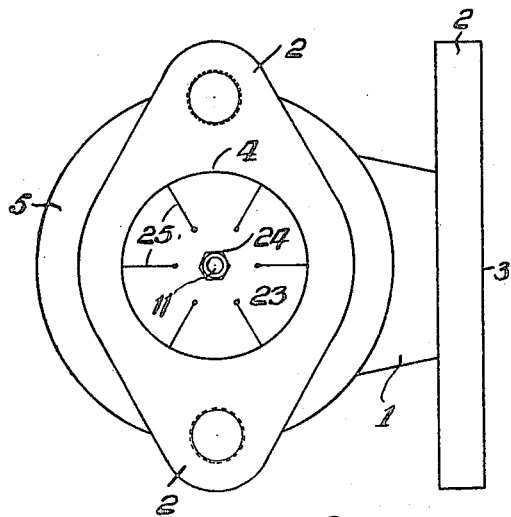
Fig. 2 is a top plan of the same.
Figure 3:
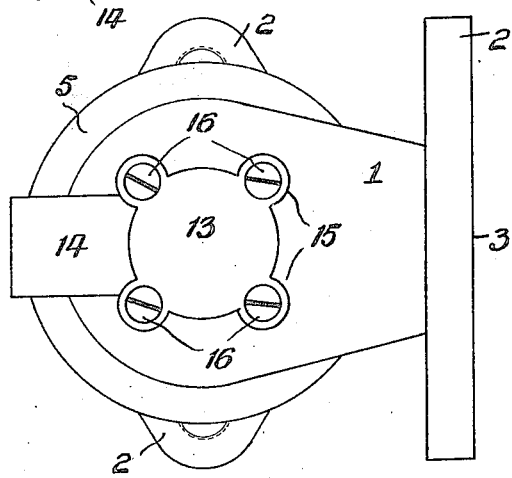
Fig. 3 is a bottom plan.

In the drawing, the reference numeral 1 denotes a conduit adapted to have fuel pass therethrough, for instance the fuel from a carbureter, and the conduit is preferably in the form of an elbow which has its ends provided with flanges 2 so that it may be conveniently installed in a fuel supply system, for instance between a carbureter and the intake manifold of an internal combustion engine. The conduit has been shown as being gradually flared from its inlet end 3 to its outlet end 4, and adjacent the outlet end 4 is a globular or enlarged portion 5 providing a valve chamber 6 having an annular valve seat 7.

The conduit 1 has an exterior enlargement 8 and an interior tubular holder 9 which is in the axis of the outlet end 4 of the conduit, and is provided with anti-frictional bearings 10 for a governor shaft 11. The exterior enlargement 8 has its end reduced, as at 12, so that a housing 13 may be fitted thereon, said housing being somewhat in the form of an elbow having a lateral portion 14 extending at a right angle to the axis of the governor shaft 11. The housing 13 is swiveled on the reduced end of the enlargement 8 so that it may be adjusted thereon and to hold said housing in a fixed position relative to the enlargement 8, said housing has a plurality of bosses for screws 16 which extend through the bosses into the enlargement 8 and hold the housing 13 relative to said enlargement. As shown, the housing 13 is capable of four adjustments, but it is obvious that the enlargement 8 may have a series of circumferentially disposed screw sockets so as to receive the screws 16 at any position to which the housing 13 may be adjusted.

In the lateral portion 14 of the housing 13 are anti-frictional bearings 17 for a driven shaft 18 and this shaft may be driven from any driven part of a motor vehicle, or the power plant thereof. On the inner end of the driven shaft 18 is a beveled gear wheel 19 meshing with a similar beveled gear wheel 20 on the end of the governor shaft 11, and by using these beveled gear wheels for transmitting power from one shaft to the other, it is possible to place the driven shaft 18 at any angle in a plane at a right angle to the axis of the governor shaft 11.

The governor shaft 11 extends in proximity to the valve seat 7 and the end of said shaft is reduced to accommodate a baffle member 21, spacer members 22, a governor valve 23, and a nut 24, the nut 24 retaining all of said members on the governor shaft and the spacer members 22 holding the baffle member 21 in a defined relation to the normal position of the governor valve 23. The baffle member 21 is preferably in the form of dished or concavo-convex disk that has peripheral edges in proximity to the valve seat 7 and said baffle member prevents an inrush of fuel from impinging against the governor valve to that extent as to materially flex or distort said valve. In some instances the baffle member may be dispensed with.

Figure 4:
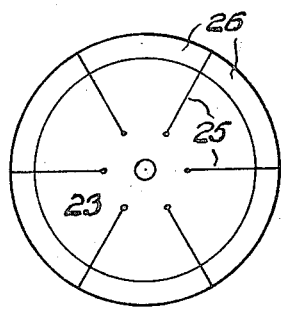
Fig. 4 is a plan of the valve *per se*.

The governor valve 23 is preferably in the form of a thin dished or concavo-convex disk of sufficient diameter to have its peripheral edges engage the seat 7, when said valve is flexed or distended to such an extent that it tends to flatten out and place the peripheral edges thereof on the seat 7 of the conduit. In order that the valve may be so flexed or distended it is provided with a plurality of radially disposed slits 25, best shown in Fig. 4 and the peripheral edges of the valve support weights or centrifugal members 26 capable of flexing or bending the slitted portions of the valve when said valve is rapidly revolved.

The peripheral edges of the valve may be rolled and filled with a heavy material so as to lend some weight to the outer ends of the slitted portions of the valve which will cause the outer ends to move toward the valve seat 7 and restrict the passage between said valve seat and the edges of the governor valve. The baffle member 21, which possesses some rigidity, will limit an excessive action of the governor valve and prevent the edges of said valve from hammering and unnecessarily wearing the valve seat. Under ordinary operating conditions the valve is not materially affected by centrifugal force, but when the governor shaft 11 is driven at an excessive speed, then the valve tends to flatten and reduce the supply of fuel to the chamber 6, such reduction resulting in a reduced speed of the governor shaft.

The rotary flexible valve is capable of other uses than that of a speed regulator, and while in the drawing there is illustrated a preferred embodiment of my invention, it is to be understood that the structural elements are susceptible to such variations and modifications as fall within the scope of the appended claims.

What I claim is:—

1. In a speed regulator, a conduit for the passage of fuel or parts thereof, a self contained governor valve in said conduit controlling the passage of fuel therethrough, an adjustable housing carried by said conduit and having a lateral extension adapted to be swung about the axis of said valve by adjustment of said housing, and means extending through the lateral extension of said housing transmitting a rotary movement to said valve.

2. In a speed regulator, a conduit having a valve seat and adapted to have gaseous matter pass therethrough under pressure, a governor shaft journaled in said conduit, a normally horizontally disposed valve carried by said shaft and adapted to have portions thereof flexed downwardly on the valve seat of said conduit against the pressure of gaseous matter passing therethrough, and a baffle member on said shaft adjacent said valve and serving as a shield for the greater part of said valve.

3. A speed regulator as characterized in claim 2, wherein the valve is in the form of a disk having peripheral portions shifted by centrifugal force.

4. In a speed regulator, a conduit having a valve seat, a governor shaft journaled in said conduit, a centrifugally actuated dished and slitted flexible valve on said shaft adapted to have its edges moved toward the valve seat of said conduit, and means adjacent said valve on said shaft serving as a shield for the central portion of said valve and to limit the flexure of said valve.

5. The combination of a conduit having a valve seat, a rotary valve in said conduit and having its central portion in a plane with the valve seat of said conduit and its peripheral edges above the plane of said valve seat, and adapted to be lowered toward the valve seat of said conduit to restrict the passage between said conduit and said valve.

6. The combination set forth in claim 5, wherein a member is supported below said valve as a shield for the central portion thereof.

7. The combination of a conduit, and a rotary valve in said conduit and having its central portion in a horizontal plane and its peripheral edges above said plane and adapted to be lowered toward said plane to restrict the passage between said conduit and said valve.

In testimony whereof I affix my signature in the presence of two witnesses.

ALBERT ARNOLD.

Witnesses:
  KARL H. BUTLER,
  ANNA M. DORR.